(12) United States Patent
Kim

(10) Patent No.: US 10,427,823 B2
(45) Date of Patent: Oct. 1, 2019

(54) LIGHTWEIGHT NECK FINISH FOR A CONTAINER

(71) Applicant: Silgan White Cap LLC, Downers Grove, IL (US)

(72) Inventor: Sungsuk Steve Kim, Batavia, IL (US)

(73) Assignee: Silgan White Cap LLC, Downers Grove, IL (US)

( * ) Notice: Subject to any disclaimer, the term of this patent is extended or adjusted under 35 U.S.C. 154(b) by 150 days.

(21) Appl. No.: 15/793,592

(22) Filed: Oct. 25, 2017

(65) Prior Publication Data

US 2019/0118989 A1    Apr. 25, 2019

(51) Int. Cl.
| | | |
|---|---|---|
| *B65D 1/02* | (2006.01) | |
| *B65D 1/44* | (2006.01) | |
| *B29B 11/08* | (2006.01) | |
| *B29B 11/14* | (2006.01) | |
| *B29L 31/00* | (2006.01) | |

(52) U.S. Cl.
CPC ............ *B65D 1/0246* (2013.01); *B29B 11/08* (2013.01); *B29B 11/14* (2013.01); *B65D 1/44* (2013.01); *B29B 2911/1402* (2013.01); *B29B 2911/14026* (2013.01); *B29B 2911/1444* (2013.01); *B29L 2031/712* (2013.01)

(58) Field of Classification Search
CPC .... B65D 1/0246; B65D 1/023; B65D 1/0223; B65D 1/02; B65D 1/0238; B65D 1/44; B65D 47/36; B65D 41/3428; B65D 41/3447; B65D 41/04; B65D 41/3409; B65D 41/06; B65D 17/402; B65D 17/404; B29B 11/08; B29B 11/14; B29B 11/06

USPC .... 215/44, 43, 258, 253, 252, 250; 220/293, 220/288, 266, 265
See application file for complete search history.

(56) References Cited

U.S. PATENT DOCUMENTS

| | | | | |
|---|---|---|---|---|
| 3,224,616 | A * | 12/1965 | Fields ................. | B65D 41/349 215/258 |
| 4,380,299 | A * | 4/1983 | Alejandro Llera ......................... | B29C 45/2618 215/252 |
| 4,461,390 | A * | 7/1984 | Csaszar .............. | B65D 41/3452 215/252 |
| 4,669,623 | A * | 6/1987 | Csaszar .............. | B65D 41/3452 215/252 |

(Continued)

*Primary Examiner* — Robert J Hicks
(74) *Attorney, Agent, or Firm* — Reinhart Boerner Van Deuren s.c.

(57) ABSTRACT

A lightweight neck finish includes a retaining structure that interacts with a tamper band to cause frangible connectors between the tamper band and closure to break upon initial removal of the closure from the neck finish. An upper retention portion of the retaining structure has a profile with a reduced footprint as compared to a conventional retaining structure. A lower support portion of the retaining structure has an outermost diameter similar in size to an outermost diameter of a conventional retaining structure. However, the lower support of the lightweight neck finish is formed with one or more circumferentially extending slots and/or one or more vertical slots. The reduced footprint of the retention portion and the slots of the support portion minimize the amount of material, weight, and time and cost required to make the lightweight neck finish, while providing for increased tamper evidence visibility as compared to conventional neck finishes.

20 Claims, 12 Drawing Sheets

(56) References Cited

U.S. PATENT DOCUMENTS

| | | | | |
|---|---|---|---|---|
| 4,744,480 | A * | 5/1988 | Luch | B26F 1/18 |
| | | | | 215/252 |
| 4,807,770 | A * | 2/1989 | Barriac | B65D 41/3428 |
| | | | | 215/252 |
| 4,984,701 | A * | 1/1991 | Margaria | B65D 41/3442 |
| | | | | 215/256 |
| 5,007,545 | A * | 4/1991 | Imbery, Jr. | B29C 33/485 |
| | | | | 215/14 |
| 5,533,633 | A * | 7/1996 | King | B65D 41/0471 |
| | | | | 215/252 |
| 6,276,543 | B1 * | 8/2001 | German | B65D 41/3409 |
| | | | | 215/252 |
| 6,484,896 | B2 * | 11/2002 | Ma | B65D 41/3409 |
| | | | | 215/252 |
| 7,637,384 | B2 * | 12/2009 | Price | B65D 41/3428 |
| | | | | 215/252 |
| 8,807,360 | B2 * | 8/2014 | Erspamer | B65D 41/3428 |
| | | | | 215/252 |

\* cited by examiner

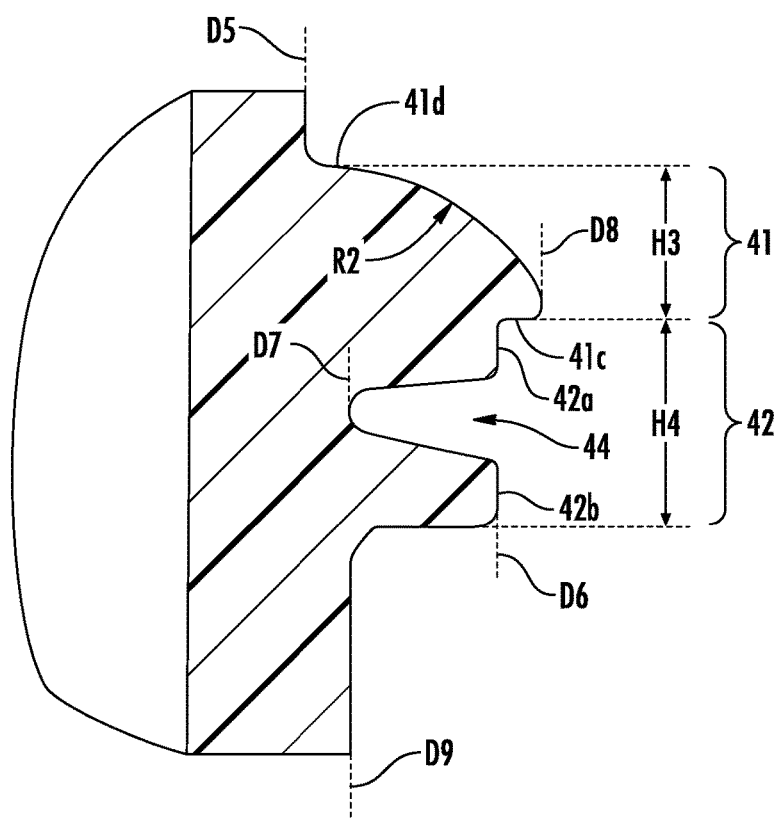

LIGHTWEIGHT NECK FINISH FOR A CONTAINER

FIELD OF THE INVENTION

The present invention relates generally to low-weight neck finishes configured to minimize the amount of material required to make the neck finish, minimize the time required to form the neck finish, and increase tamper evidence visibility following removal of a closure from the neck finish.

SUMMARY OF THE INVENTION

In one embodiment, a container includes a body portion defining an interior and a neck finish. The neck finish includes a cylindrical neck having a first end and a second end. A channel extends between the first end and the second end of the neck The first end of the neck is attached to and extends from an upper end of the body portion. The second end of the neck defines an opening configured to provide for fluid communication between the interior of the body portion and a location outside the container.

A thread extends about an exterior surface of an upper portion of the neck. The thread is configured to engage a corresponding engagement structure on a closure to seal the opening when a closure is attached to the neck.

A retention element extends outwardly from the exterior surface of the neck at a location below a lowermost portion of the thread. The retention element is configured to engage a corresponding retention structure on a tamper band portion of a closure upon initial removal of a closure formed with a tamper band from the neck of the container.

The retention element includes a first structure comprising an upper surface extending between a first end and a second end. The first end of the upper surface is attached to the exterior surface of the neck. A lower surface extends between a first end and a second end. The first end of the lower surface is attached to the exterior surface of the neck.

The second end of the upper surface and the second end of the lower surface are each located radially outwards relative to the exterior surface of the neck at substantially the same distance as measured from a vertical axis about which the neck is centered. The second end of the upper surface and the second end of the lower surface are each located at substantially the same height along the vertical axis. The upper surface extends between the upper surface first end and the upper surface second end along a curve.

The retention element includes a second structure comprising a circumferentially extending main body portion having an uppermost end attached to and extending downwards from a bottom end of the lower surface of the first structure. A radially outermost portion of an exterior surface of the main body is located radially inwards relative to each of the second ends of the upper and lower surfaces of the first structure. A lowermost end of the exterior surface of the main body is located radially outwards relative to the exterior surface of the neck and radially inwards relative to each of the second ends of the of the upper and lower surfaces of the first structure.

A circumferentially extending groove is formed within and extends circumferentially about at least a portion of the main body at a height along the main body located between the uppermost end and the lowermost end.

The circumferentially extending groove has a height as measured along the vertical axis and a length as measured in a circumferential direction. The length of the circumferentially extending groove is greater than the height of the circumferentially extending groove.

In one embodiment, a container includes a body defining a cavity. A neck finish having a first end is attached to and extends upwards from the body. An opening defines a second end of the neck portion.

A flow channel is defined between the first end and the second ends of the neck portion. The flow channel is configured to allow contents to pass through the opening in the neck finish and into or out from the body cavity. A thread extends about the exterior of the neck finish at a location proximate the neck finish second end.

An engagement structure is formed about the exterior of the neck at a location below the thread. The engagement structure includes a circumferentially extending upper bead defined by an upper surface that extends from a first end attached to the exterior of the neck finish to a second end located below the first end. The second end is radially spaced from the exterior of the neck finish. The upper surface extends from the first end to the second end along a curve.

The upper bead further is defined by a lower surface that extends generally perpendicularly radially outwards from the exterior of the neck finish towards the second end of the upper surface of the upper bead.

A circumferentially extending lower bead is located immediately below the lower surface of the upper bead. At least a portion of an exterior of the lower bead is defined by a first section having a first end attached to a lower surface of the upper bead. The first section extends downwardly from the lower surface of the upper bead.

A second section having a first end is attached to a second end of the first section. The second section extends radially inwards from the second end of the first section. A third section having a first end is attached to a second end of the second section. The third section extends radially outwards from the second end of the second section. A fourth section having a first end is attached to a second end of the third section. The fourth section extends downwardly from the second end of the third section.

A radially outermost portion of an exterior surface of the lower bead is located radially inwards relative to the second end of the upper surface of the upper bead and radially outwards relative to the exterior of the neck.

In one embodiment, a container includes a container body defining a cavity. A neck portion having a first end is attached to and extends upwards from the body. An opening defines a second end of the neck portion.

A flow channel extends between the first end and the second end of the neck portion. The flow channel is configured to allow contents to pass through the opening in the neck portion and into or out from the body cavity. A thread extends about the exterior of the neck portion at a location proximate the neck portion second end.

An engagement structure is formed about the exterior of the neck portion at a location below the thread. The engagement structure includes a circumferentially extending upper engagement structure defined by an upper surface that extends from a first end to a second end along a curve. The first end of the upper surface is attached to the exterior of the neck portion. The second end of the upper surface is located at a position along a vertical axis about which the neck portion is centered that is below the first end of the upper surface. The upper structure is further defined by a lower surface that extends generally perpendicularly radially outwards from the exterior of the neck portion towards the second end of the upper surface of the upper bead.

A second lower engagement structure includes a first plurality of rib elements attached to and extending radially outwards from an exterior of the neck portion, each rib element being separated from an adjacent rib element by a gap. Each of the rib elements of the first plurality of rib elements has a curved outer surface. The curved outer surfaces of each of the rib elements are arranged about a first generally circular path centered about the vertical axis.

A second plurality of rib elements is attached to and extends radially outwards from an exterior of the neck portion. Each rib element is separated from an adjacent rib element by a gap. Each of the rib elements of the second plurality of rib elements has a curved outer surface. The curved outer surfaces of each of the rib elements are arranged about a second generally circular path centered about the vertical axis.

Each of the rib elements of the first plurality of rib elements is located at a first height relative to the vertical axis. Each of the rib elements of the second plurality of rib elements is located at a second height relative to the vertical axis. The second height is lower than the first height.

A laterally extending channel is defined between the lower surfaces of at least some of the rib elements of the first plurality of rib elements and the upper surface of at least some of the rib elements of the second plurality of rib elements.

BRIEF DESCRIPTION OF THE DRAWINGS

This application will become more fully understood from the following detailed description, taken in conjunction with the accompanying figures, wherein like reference numerals refer to like elements in which:

FIG. 4C is an enlarged sectional view of the retaining structure portion of the neck finish of FIG. 4A;

DETAILED DESCRIPTION

Closures having tamper indicating features are commonly used to seal a variety of containers. One particular type of tamper indicating feature commonly used with closures comprises a tamper band connected via one or more frangible connections to a lower portion of the skirt of a closure. This type of closure formed with a tamper band typically relies on a portion of the container to which the closure is attached to restrain the tamper band when the closure is initially removed from the container. This restraint of the tamper band by the closure during the initial removal of the closure from the container causes the frangible connections between the closure and tamper band to break. The resultant disruption of the connection between the tamper band and the closure signifies to a user that the closure has previously been removed from the container.

Figure 1A:
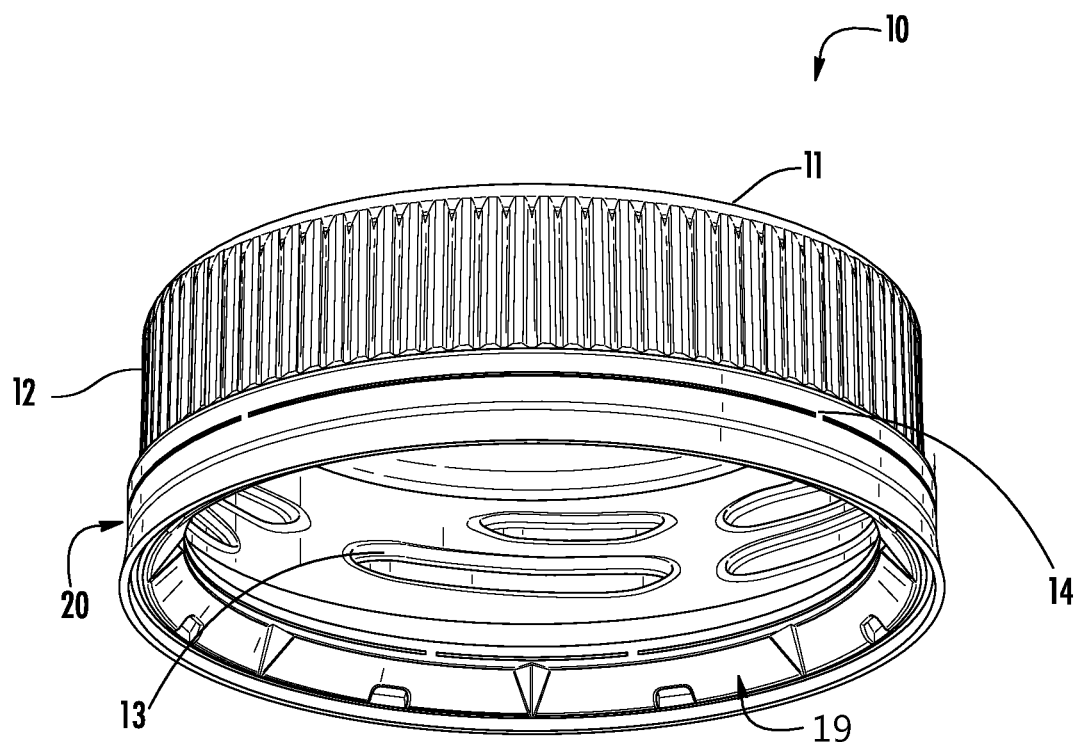
FIG. 1A is a bottom perspective view of a closure having a tamper band.

Illustrated in FIG. 1A is a representative example of a closure 10 having a tamper band 20. As shown in FIG. 1A, the closure 10 generally includes a top wall 11 and a skirt 12 extending generally perpendicularly from an outer periphery of the top wall 11. A sealing gasket may be provided along a portion of the bottom surface of the top wall 11 to assure a sealed closing of the container to which the closure 10 is applied. The skirt 12 of the closure 10 is internally provided with a thread 13 configured to retain the closure 10 on the neck finish 30 of a container. The closure 10 can be made of any suitable material. In one embodiment, closure 10 is made of polypropylene or copolymers thereof. Closure 10 may be formed by injection molding or by other molding operations.

Referring to FIG. 1A, a tamper band 20 is secured to the closure 10 at the lower end of the skirt 12. The tamper band 20 is attached to the skirt 12 via one or more frangible connections 14. The frangible connections 14 between the skirt 12 and the tamper band 20 may comprise any number of known connection arrangements, such as, e.g. breakable webs, circumferential slits, fracturable bridges, etc. that are configured to permit detachment of the tamper band 20 from the skirt 12 when the closure 10 is initially removed from a container.

Located on the inner surface of the tamper band 20 are one or more radially inwardly projecting retaining elements. As shown in FIG. 1A, in one embodiment, the retaining element may comprise one or more J-bands 21. Each J-band 21 is attached at a lower end to the inner surface 19 of the tamper band 20 via a hinge 22. The upper, free end of each J-band 21 is defined by an engagement surface 23. The retaining elements may comprise any number of structures (e.g. bead, tabs, flanges, etc.) configured to project radially inwards from an inner surface 19 of the tamper band 20 and engage a corresponding retaining structure 40 on the neck finish 30 of a container to which the closure 10 is attached.

Figure 1B:
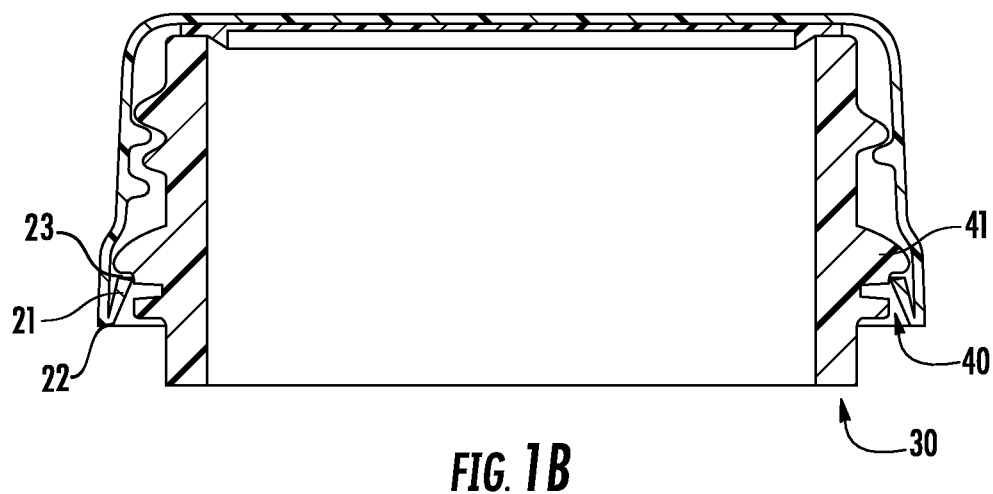
FIG. 1B is a sectional view of a closure having a tamper band attached to a neck finish according to one embodiment.

Turning to FIG. 1B, a sectional view of a closure 10 attached to one embodiment of a weight-reducing container neck finish 30 retaining structure 40 is illustrated. As shown in FIG. 1B, the retaining structure 40 is configured to engage the retaining elements of a tamper band 20. As illustrated by the embodiment of the neck finish shown in FIG. 1B, in general the neck finish 30 includes a sealing surface 31 circumscribing an opening 32 into the container. Located along the exterior surface of the neck finish 30 below the sealing surface 31 is a closure engagement element, such as, e.g. a thread 33 via which the closure 10 is sealed to the container.

When a closure 10 is initially attached to the container neck finish 30 to sealingly close the container, the retaining elements, such as e.g. the engagement surfaces 23 of J-bands 21, of the closure 10 are located below and at least partially radially inwards from an upper retention portion 41 of a retaining structure 40 formed about and extending radially outwards from an outer periphery of the neck finish 30 of the container to which the closure 10 is attached.

Upon initial removal of the closure 10 from the container, the upward movement of the closure 10 relative to the neck finish 30 and retaining structure 40 of the neck finish 30 of the container results in the engagement of at least a portion of the retaining elements of the closure 10, e.g. an engagement surface 23 of a J-band 21, with a portion of a lower surface 41c of the upper retention portion 41 of the retaining structure 40 of the neck finish 30. This engagement between the retaining elements of the closure 10 and the upper retention portion 41 of the retaining structure 40 prevents further upward or axial movement of the tamper band 20 relative to the container neck finish 30 as the closure 10 continues its upwards movement relative to the neck finish 30. Eventually, this interaction with and restraint of the upward movement of the retaining elements of the closure 10 by the retaining structure 40 of the neck finish 30 causes the frangible connections 14 between the tamper band 20 and closure 10 to stretch and break.

In addition to the retaining structure 40 having an upper retention portion 41 configured to engage the retaining elements of the closure 10 to restrain upwards movements of the tamper band 20 relative to the container neck finish 30, the retaining structure 40 of the container neck finish 30 may also include a lower support portion 42 extending outwards from the outer surface of the neck finish 30 at a location below the upper retention portion 41 of the retaining structure 40 and having an outermost diameter smaller than that of the upper retention portion 41 of the retaining structure 40. The outer diameter of the lower support portion 42 generally corresponds to the inner diameter defined by the retaining elements, e.g. J-bands 21, of the tamper band 20 once the closure 10 is applied to the container.

The lower support portion 42 of the retaining structure 40 is configured to ensure that retaining elements of the closure 10 engage with the lower surface 41c of the upper retention portion 41 of the retaining structure 40 during initial removal of the closure 10 from the container. For example, when neck finish 30 is used with closures 10 having a tamper band in which the retaining element comprises a J-band 21, the lower support portion 42 of the retaining structure 40 is configured to compresses the J-band 21 in a configuration in which the engagement surface 23 of J-band 21 is positioned directly beneath the lower surface 41c of the upper retention portion 41 of the retaining structure 40. Accordingly, when the closure 10 is removed from the container, the J-band 21 is properly positioned so as to interact with the bottom surface of the upper retention portion 41 of the retaining structure 40 to effectuate the breaking of the frangible connections 14 between the closure 10 and tamper band 20. Additionally, the presence of the lower support portion 42 at its location between the exterior of the neck finish 30 and the inner surface of the J-band 21 is configured to prevent the J-band 21 from unfolding during initial removal of the closure 10 from the container, which could otherwise result in the tamper band 20 being removed with the closure 10 and without the frangible connectors 14 being broken upon initial opening of the container.

In addition to being configured to ensure engagement of the retaining elements of the closure 10 with the lower surface 41c of the upper retention portion 41 of the retaining structure 40 of the neck finish 30, the support structure 42 of the retaining structure 40 is also configured to prevent tampering with or manipulation of the tamper band 20. Specifically, the presence of the lower support portion 42 extending within the gap that would otherwise exist between the innermost surfaces of the retaining elements of the closure 10 and the outer surface of the neck finish 30 limits access to the engagement surfaces of the retaining elements of the closure 10, access which a user could otherwise potentially use as a means to manipulate the tamper band 20 out of engagement with the neck finish 30 of the container without breaking the frangible connections 14 between the tamper band 20 and the closure 10, and without leaving any evidence that the container had been opened.

For reasons as explained above, the incorporation of a retaining structure 40 comprising both an upper retention portion 41 and a lower support portion 42 on a neck finish 30 is desirable to ensure the proper functioning of a tamper band 20 (i.e. preventing or minimizing the ability of the tamper band 20 to be removed, intentionally or unintentionally, from the neck finish 30 without breaking the frangible connections 14). However, the relatively larger thicknesses of the upper retention portion 41 and the lower support portion 42 relative to one another and to the rest of the neck finish 30, which are required to provide the retaining structure 40 with a configuration that allows the retaining structure 40 to serve its desired functions, results in both additional materials being required to form the retaining structure 40 as well as additional time being required to mold a neck finish having a retaining structure.

Described in more detail with regards to FIGS. 2-8 and 10 are various embodiments of neck finishes 30 incorporating various embodiments of retaining structures 40, each of which is configured to provide the desired characteristics to a neck finish 30 related to the engagement of the retaining structure 40 with the tamper band 20 of a closure and which do so while minimizing the amount of material, cost, and time involved in creating the neck finishes 30. In particular, the lightweight neck finish 30 embodiments illustrated in the figures and described herein may speed up machine cycle time by at least 2 seconds, may allow for easier initial closure 10 application onto the neck finish 30, and may help ensure that the tamper band 20 remains attached to the neck finish 30 following the initial removal of the closure 10 from the container. As will be understood by those having skill in the art, the neck finish 30 and retaining structure 40 configurations described herein can be made from any commonly used materials, such as e.g., but not limited to polymers, e.g. PET, glass, etc. and can be made in any number of sizes as desired and appropriate for a particular use.

Figure 2A:
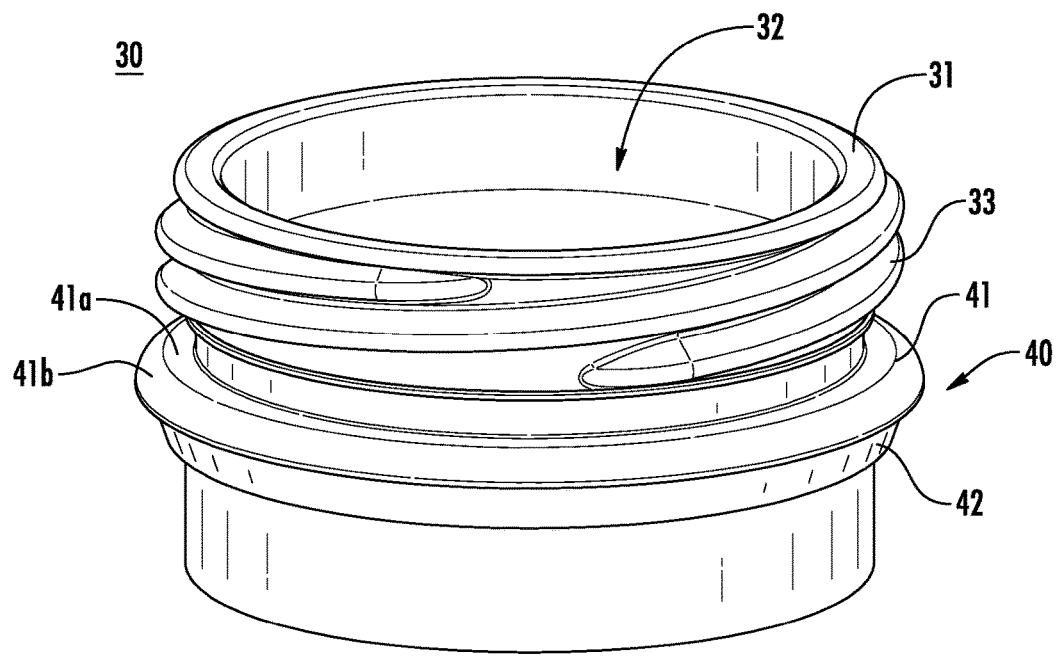
FIG. 2A is a top perspective view of a neck finish according to one embodiment.
Figure 2B:
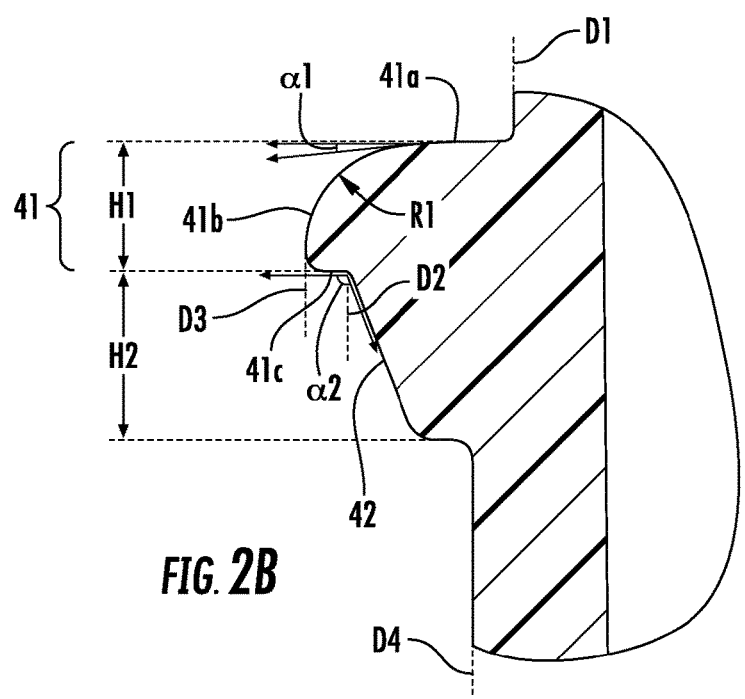
FIG. 2B is an enlarged sectional view of the retaining structure portion of the neck finish of FIG. 2A.

As shown in FIGS. 2A and 2B, in one embodiment, the lower retention portion 42 of the retaining structure 40 may be formed having a tapered, frustoconical shape, instead of lower portion 42 being formed as an annular cylindrical structure such as typical in conventional retaining structures. As shown in FIG. 2B, the larger diameter upper end of the tapered lower support portion 42 configuration, which may correspond in diameter to, e.g. the diameter of the cylindrical lower portion of a conventional retaining structure, allows the lower support portion 42 to align the retaining elements of the closure 10 underneath the lower surface 41*c* of the retention portion 41. Meanwhile, the tapered lower portion of the lower support portion 42 does away with the additional material that would otherwise be present in a conventional, cylindrical lower support portion structure.

Referring to FIG. 2B, in one embodiment, neck finish 30 may have an exterior diameter D1 as measured at a location below thread 33 and above retaining structure 40 that is between approximately 0.800 inches and approximately 1.700 inches, more specifically between approximately 1.100 inches and approximately 1.400 inches, even more specifically between approximately 1.200 inches and approximately 1.300 inches, and even more specifically approximately 1.264 inches.

Lower support portion 42 may have an outermost diameter D2 that is between approximately 1.000 inches and approximately 2.000 inches, more specifically between approximately 1.300 inches and approximately 1.700 inches, even more specifically between approximately 1.400 inches and approximately 1.600 inches, and even more specifically approximately 1.440 inches.

Lower support portion 42 may have a height H2 that is between approximately 0.050 inches and approximately 0.150 inches, more specifically between approximately 0.070 inches and approximately 0.130 inches, even more specifically between approximately 0.090 inches and approximately 0.110 inches, and even more specifically approximately 0.095 inches.

The frustoconical exterior surface of lower support portion 42 may extend along an angle α2 relative to a horizontal axis of between approximately 70° and approximately 150°, more specifically between approximately 90° and approximately 130°, even more specifically between approximately 100° and approximately 120°, and even more specifically approximately 110°.

Retention portion 41 may have an outermost diameter D3 that is between approximately 1.100 inches and approximately 2.100 inches, more specifically between approximately 1.300 inches and approximately 1.800 inches, even more specifically between approximately 1.400 inches and approximately 1.600 inches, and even more specifically approximately 1.490 inches.

Retention portion 41 may have a height H1 that is between approximately 0.020 inches and approximately 0.120 inches, more specifically between approximately 0.040 inches and approximately 0.100 inches, even more specifically between approximately 0.060 inches and approximately 0.080 inches, and even more specifically approximately 0.070 inches.

The generally flat innermost portion 41*a* of retention portion 41 that extends radially outwards from the exterior of the neck finish 30 may extend along an angle α1 relative to the horizontal axis of between approximately 0° and approximately 10°, more specifically between approximately 2° and approximately 8°, even more specifically between approximately 4° and approximately 6°, and even more specifically approximately 5°.

The tightly curved portion 41*b* of retention portion 41 may have a radius of curvature R1 that is between approximately 0.035 inches and approximately 0.075 inches, more specifically between approximately 0.040 inches and approximately 0.080 inches, even more specifically between approximately 0.052 inches and approximately 0.058 inches, and even more specifically approximately 0.055 inches.

Neck finish 30 may have an exterior diameter D4 as measured at a location directly beneath lower support portion 42 that is between approximately 0.900 inches and approximately 1.700 inches, more specifically between approximately 1.100 inches and approximately 1.500 inches, even more specifically between approximately 1.200 inches and approximately 1.400 inches, and even more specifically approximately 1.304 inches.

Although the retaining structure 40 embodiment of FIGS. 2A and 2B provides a lower-weight, faster to mold alternative to the retaining structure configurations of conventional neck finishes, in some embodiments it may be desired to further minimize the weight and thickness of the retaining structure 40. Also, because the frustoconical configuration of the lower support portion 42 of the retaining structure 40 embodiment of FIGS. 2A and 2B is not configured to secure a J-band 21 in a folded configuration along the entire height of the tapered lower support portion 42 configuration of the retaining structure 40 embodiment of FIGS. 2A and 2B, such a tapered configuration may result in increased instances of J-band unfolding, or roll-out, as compared, e.g. to retaining structure 40 embodiments having a generally cylindrical lower support portion configuration 42.

Figure 3A:
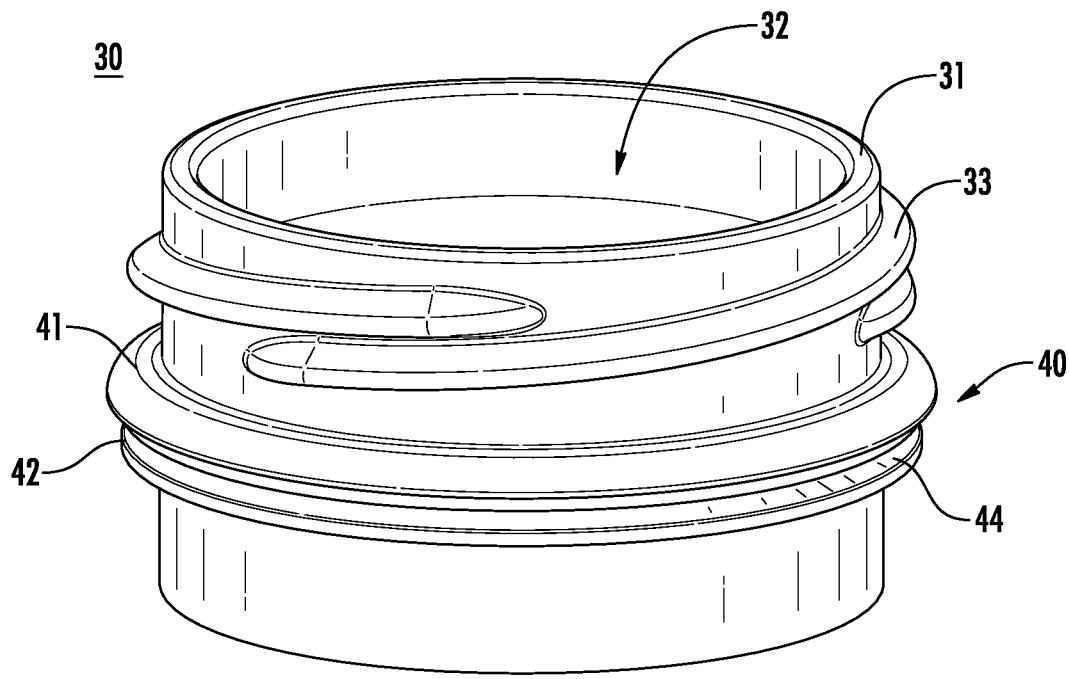
FIG. 3A is a top perspective view of a neck finish according to one embodiment.
Figure 3B:
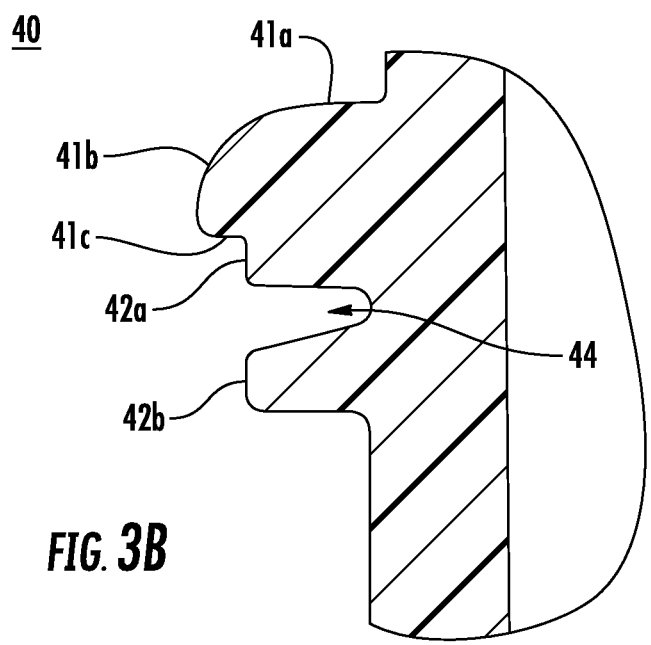
FIG. 3B is an enlarged sectional view of the retaining structure portion of the neck finish of FIG. 3A.

Accordingly, referring to FIGS. 3A and 3B, in one embodiment of a light-weight container neck finish 30 configured to reduce the material and time required to form/mold a container, the lower support portion 42 of the retaining structure 40 of the container neck finish 30 is generally defined by an outer periphery having a generally cylindrical footprint. However, in order to minimize the amount of material required to form the lower support portion 42, extending circumferentially about the lower support portion 42 of the neck finish 30 embodiment of FIGS. 3A and 3B is a groove or slot 44, which divides the lower support portion 42 into an upper portion 42*a* and a lower portion 42*b*.

Although the slot 44 is illustrated as extending uninterruptedly circumferentially about the entirety of the neck finish 30, it is to be understood that in some embodiments, the slot 44 may extend circumferentially about only a portion of the neck finish 30 and/or the slot 44 may be segmented. Furthermore, although only a single slot 44 is illustrated, it is to be understood that additional slots 44 may be formed about the lower support portion 42 at locations above and/or below the slot 44.

Figure 4A:
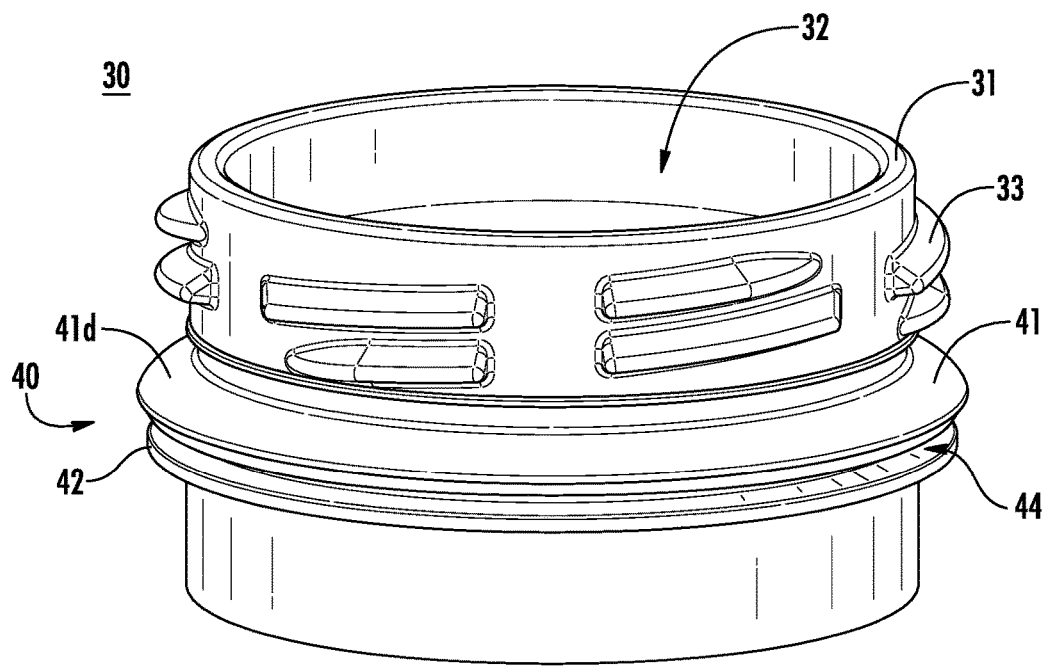
FIG. 4A is a top perspective view of a neck finish according to one embodiment.
Figure 4B:
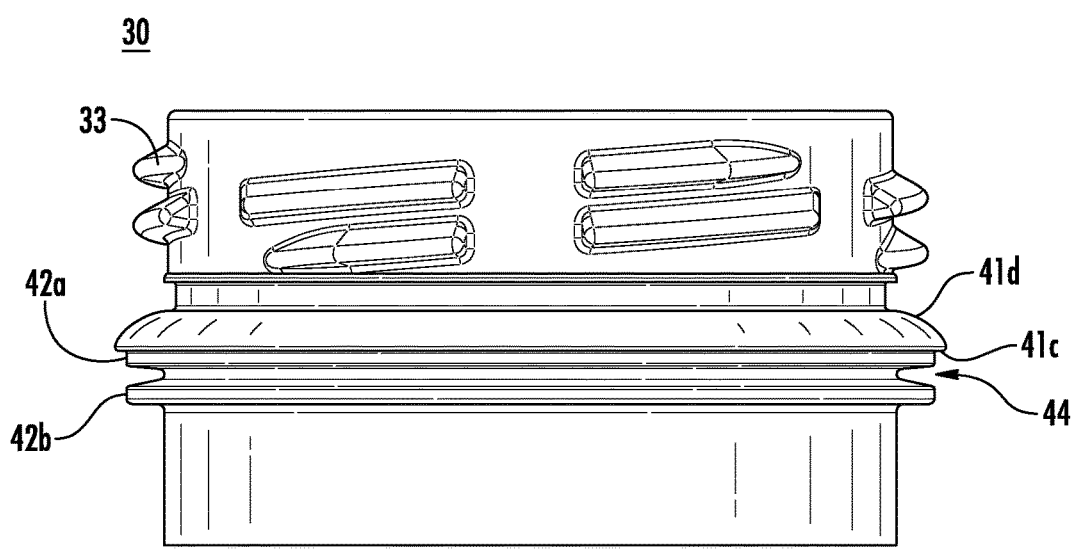
FIG. 4B is a side view of the neck finish of FIG. 4A.

Illustrated in FIGS. 4A-4C is one embodiment of a neck finish 30 that provides for even greater weight reduction as compared to a conventional retaining structure configuration, as well as even more weight savings as compared to the neck finish 30 embodiment of FIGS. 3A and 3B. Similar to the slotted lower support portion 42 of the retaining structure 40 configuration of the embodiment of FIGS. 3A and 3B, the lower support portion 42 of the embodiment of FIGS. 4A-4C is similarly formed with a slot 44 extending circumferentially about the outer periphery of the lower support portion 42.

In addition to incorporating a slot 44 in lower support portion 42, the retaining structure 40 embodiment of FIGS. 4A-4C is also configured to provide additional weight-saving and mold-time reduction via a reduced footprint retention portion 41 configuration. Specifically, while the height and width (as measured in a radial direction) of the upper retention portion 41 of the embodiment of FIGS. 4A-4C is similar to the height width of the upper retention portion 41 of the retaining structure 40 embodiment of FIGS. 3A and 3B (which in turn has upper retention portion 41 dimensions similar to the retention portion 41 of the neck finish 30 embodiment of FIGS. 2A and 2B), the configuration of the uppermost surface 41d of the upper retention portion 41 of the neck finish 30 embodiment of FIGS. 4A-4C is defined by a smaller footprint than the uppermost surface configuration (i.e. flat innermost portion 41a and tightly curved portion 41b) of the upper retention portion 41 of the retaining structure 40 of FIGS. 3A and 3B.

Specifically, whereas the uppermost surface of the upper retention portion 41 of the embodiment of FIGS. 3A and 3B comprises a generally flat innermost portion 41a that extends radially outwards from the exterior of the neck finish 30 and transitions into an outermost, tightly curved portion 41b having a relatively small radius of curvature, the uppermost surface 41d of the upper retention portion 41 of the embodiment of FIGS. 4A-4C follows a gentle curve having a relatively large radius of curvature R2. As illustrated in FIG. 4A, this gently rounded curved uppermost surface 41d that is curved along an entirety, or substantially all, of its periphery is configured to minimize the volume of the upper retention portion 41 as compared to, e.g. the volume of the upper retention portion 41 of the retaining structure 40 of the embodiment of FIGS. 3A and 3B.

Referring to FIG. 4C, in one embodiment, neck finish 30 may have an exterior diameter D5 as measured at a location below thread 33 and above retaining structure 40 that is between approximately 0.800 inches and approximately 1.800 inches, more specifically between approximately 1.100 inches and approximately 1.500 inches, even more specifically between approximately 1.200 inches and approximately 1.400 inches, and even more specifically approximately 1.290 inches.

Lower support portion 42 may have an outermost diameter D6 that is between approximately 1.000 inches and approximately 2.000 inches, more specifically between approximately 1.300 inches and approximately 1.700 inches, even more specifically between approximately 1.400 inches and approximately 1.600 inches, and even more specifically approximately 1.440 inches.

Lower support portion 42 may have a height H4 that is between approximately 0.050 inches and approximately 0.150 inches, more specifically between approximately 0.070 inches and approximately 0.130 inches, even more specifically between approximately 0.090 inches and approximately 0.110 inches, and even more specifically approximately 0.095 inches.

An upper surface 44a of the slot may extend radially inwards from the outermost exterior surface of the lower support portion 42 along an angle α3 relative to a horizontal axis of between approximately 0° and approximately 10°, more specifically between approximately 1° and approximately 7°, and even more specifically between approximately 2° and approximately 5°.

A radially innermost portion of slot 44 may have a diameter D7 between approximately 0.900 inches and approximately 1.700 inches, more specifically between approximately 1.100 inches and approximately 1.500 inches, even more specifically between approximately 1.200 inches and approximately 1.400 inches, and even more specifically approximately 1.304 inches A lower surface 44b of the slot may extend radially outward from the innermost portion of slot 44 to the exterior surface of lower support portion 42 along an angle α4 relative to a horizontal axis of between approximately 8° and approximately 18°, more specifically between approximately 11° and approximately 15°, and even more specifically between approximately 12° and approximately 14°.

Retention portion 41 may have an outermost diameter D8 that is between approximately 1.100 inches and approximately 2.100 inches, more specifically between approximately 1.300 inches and approximately 1.800 inches, even more specifically between approximately 1.400 inches and approximately 1.600 inches, and even more specifically approximately 1.490 inches.

Retention portion 41 may have a height H3 that is between approximately 0.020 inches and approximately 0.120 inches, more specifically between approximately 0.040 inches and approximately 0.100 inches, even more specifically between approximately 0.060 inches and approximately 0.080 inches, and even more specifically approximately 0.070 inches.

The uppermost surface 41d of retention portion 41 may extend from a location at or substantially adjacent an exterior surface of the neck finish 30 to a location at or substantially adjacent an outermost end of the retention portion 41 along a curve having a radius of curvature R2 that is between approximately 0.070 inches and approximately 0.160 inches, more specifically between approximately 0.085 inches and approximately 0.135 inches, even more specifically between approximately 0.100 inches and approximately 0.120 inches, and even more specifically approximately 0.112 inches.

Neck finish 30 may have an exterior diameter D9 as measured at a location directly beneath lower support portion 42 that is between approximately 0.900 inches and approximately 1.700 inches, more specifically between approximately 1.100 inches and approximately 1.500 inches, even more specifically between approximately 1.200 inches and approximately 1.400 inches, and even more specifically approximately 1.304 inches.

In addition to the weight-savings to the neck finish 30 provided by the modified retaining structure 40 upper retention portions 41 and lower support portion 42, the embodiment of neck finish 30 shown in FIGS. 4A and 4B may incorporate yet another weight reducing feature in the form of a segmented thread 33. In addition to minimizing the weight of the neck finish 33, a segmented thread 33 configuration as illustrated in, e.g. FIGS. 4A and 4B may prevent or minimize damage that the threads 33, formed of a relatively stiff material, such as e.g. PET, may cause to a lightweight closure, formed of a softer material such as, e.g. HDPE. Specifically, the segmented thread configuration 33 illustrated, e.g. in FIGS. 4A and 4B, may minimize or prevent the relatively stiffer threads from digging into the closure when the closure is applied to the neck finish by increasing strip torque of the segmented thread 33 by up to twice as much as compared to a conventional thread design. It is to be understood that a segmented thread 33 configuration as illustrated in FIGS. 4A and 4B may incorporated into any of the other embodiments of neck finish 30 described herein. Similarly, it is to be understood that the neck finish 40 of the embodiment of FIGS. 4A and 4B may be formed with a non-segmented thread 33 configuration, such as, e.g. shown in FIGS. 3A and 3B.

Turning to FIGS. 5A-5F, another embodiment of a lowweight retaining structure 40 for a container neck finish 30 is illustrated. Similar to the configuration of the retaining structure 40 embodiment of FIGS. 4A-4C, the retaining structure 40 of the embodiment of FIGS. 5A-5F also includes a gently curved uppermost surface 41d defining a low-profile upper retention portion 41 and a lower support portion 42 formed with a circumferentially extending slot 44. In addition to these features, the lower support portion 42 of the retaining structure 40 embodiment of FIGS. 5A-5F provides even more weight savings to the neck finish 30 is the form of one or more vertically extending slots 48 extending along the height of the lower support portion 42 which divide the lower support portion 42 into a plurality of circumferentially extending vertical ribs 47.

Figure 5A:
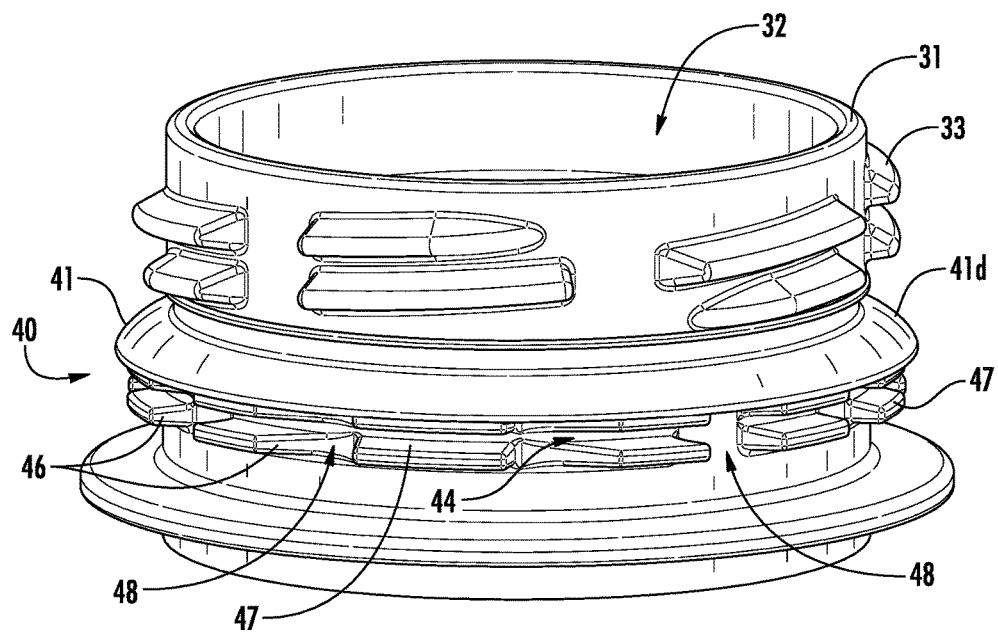
FIG. 5A is a top perspective view of a neck finish according to one embodiment.
Figure 5B:
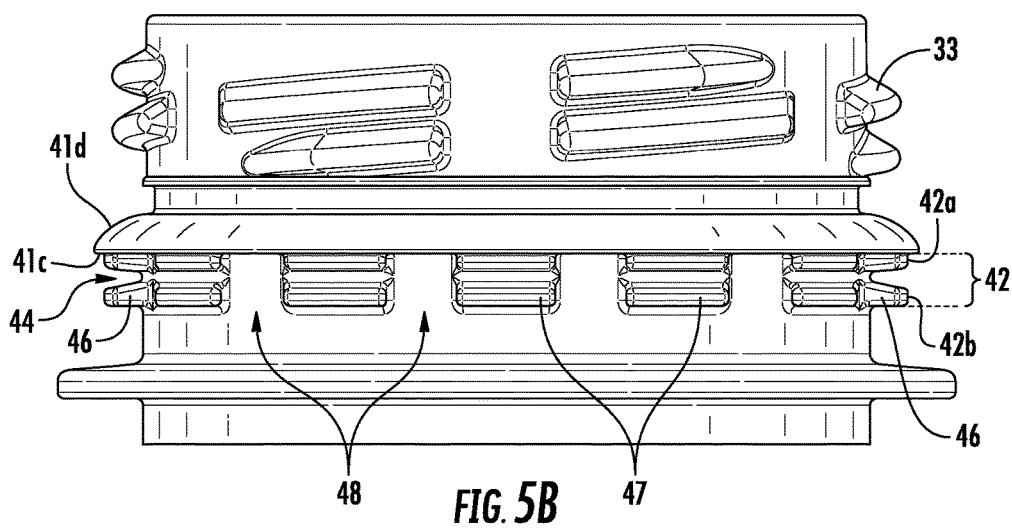
FIG. 5B is a front side view of the neck finish of FIG. 5A.
Figure 5C:
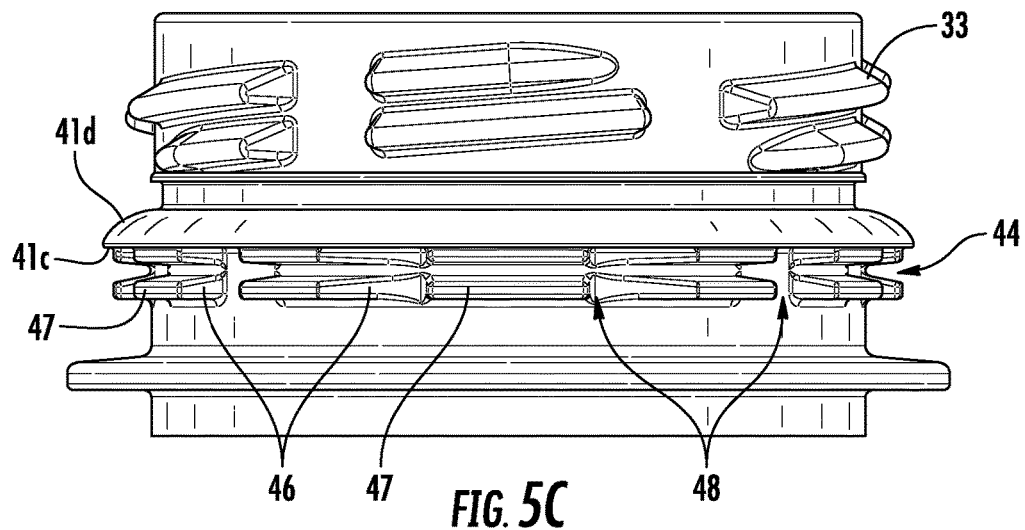
FIG. 5C is a right side view of the neck finish of FIG. 5A.

As shown in FIGS. 5A-5C, in some embodiments the geometries of the individual ribs 47 may vary about the periphery of the neck finish 30. In some embodiments of retaining structures 40 incorporating vertical slots 48, the edges 46 of some ribs 47 may extend substantially perpendicularly radially outwards relative to the exterior of the neck finish 30. In other embodiments, the edges 46 of ribs 47 may extend radially outwards at non-90° angles from the exterior of the neck finish 30, such that the angular length of the innermost portion of the rib 47 that is attached to the neck finish 30 as measured in an angular direction is less than or greater than the angular length of the outermost peripheral surface of the rib 47 as measured in an angular direction. In yet other embodiments, the edges 46 of ribs 47 formed about the neck finish 30 may include a combination of ribs 47 having perpendicularly radially outward extending edges as well as ribs 47 having edges 46 that extend outwards relative to the exterior surface of the neck finish 30 at non-90° angles.

Furthermore, as illustrated in FIGS. 5A-5C, the angular lengths of the ribs 47 may vary about the exterior periphery of the neck finish 30. For example, the lower support portion 42 may comprise two diametrically opposed end ribs 47 having angular lengths greater than the angular lengths of the remaining ribs 47.

Figure 5D:
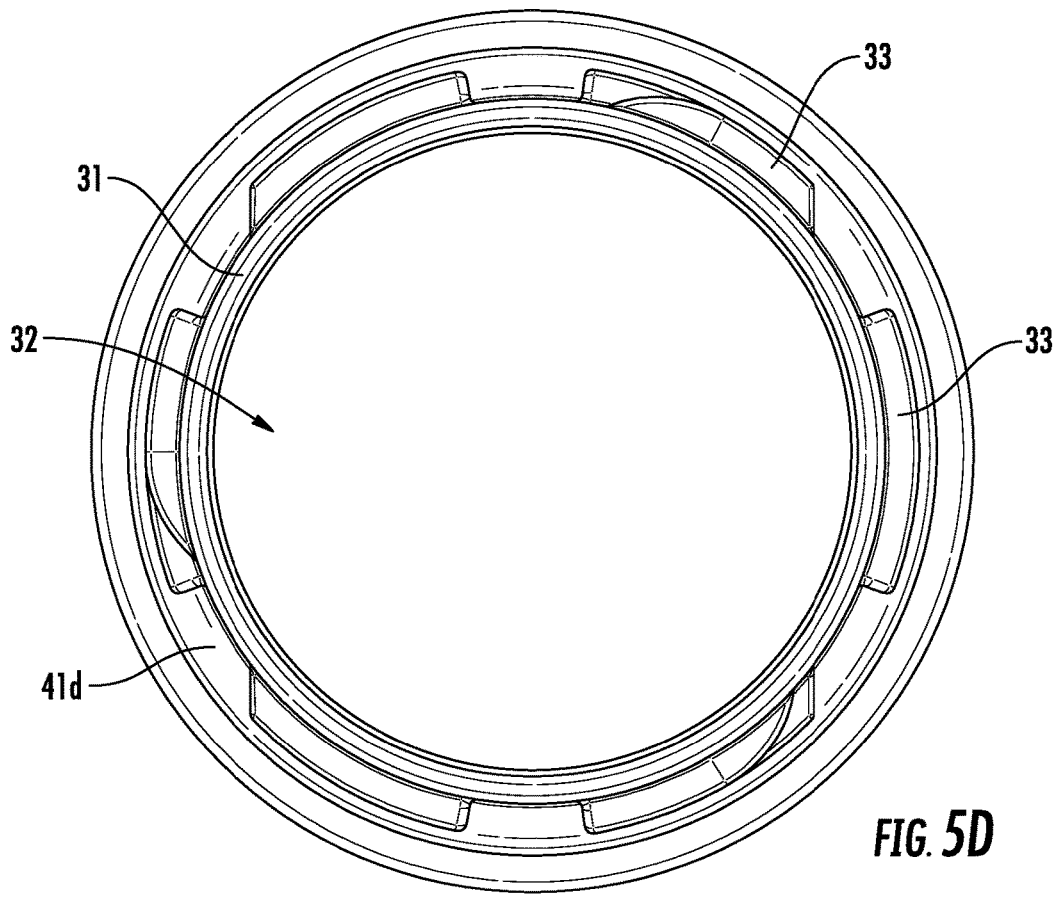
FIG. 5D is a top view of the neck finish of FIG. 5A.
Figure 5E:
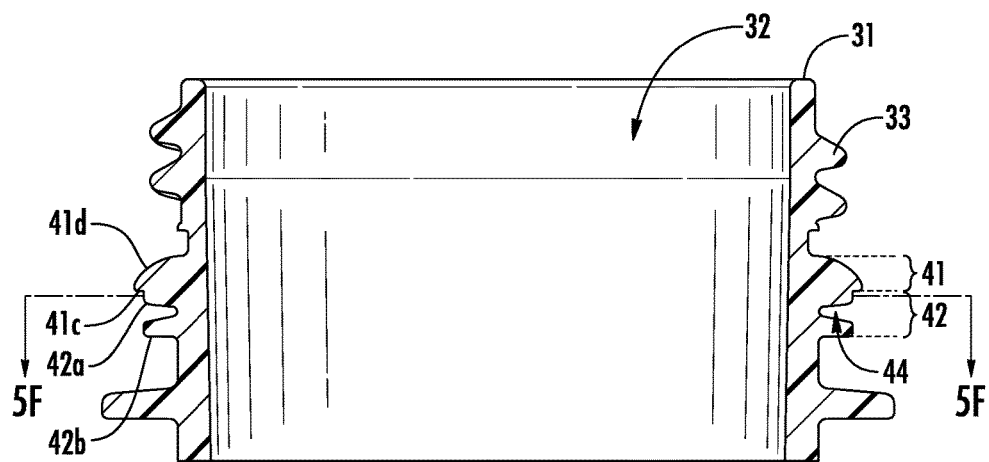
FIG. 5E is a sectional view of the neck finish of FIG. 5A.

Although, as shown in FIGS. 5A-5C, the geometries of the ribs 47 forming the lower support portion 42 may vary about the outer periphery of the exterior of the neck finish 30, as illustrated in FIG. 5D, the outermost surfaces of each of the ribs 47 are each located at an equal distance from the center of the container neck finish 30, such that the curved outer peripheries of the ribs 47 generally lie along a common circle centered about a vertical axis of the neck finish 30.

As illustrated in FIGS. 5A-5C, the edges 46 of some adjacent ribs 47 may be separated from one another by vertically extending slots 48 defined by portions of the exterior surface of the neck finish 30. Other ribs 47 may be separated from adjacent ribs by vertical slots 48 that may not necessarily extend all the way to the exterior surface of the neck finish 30.

Figure 5F:
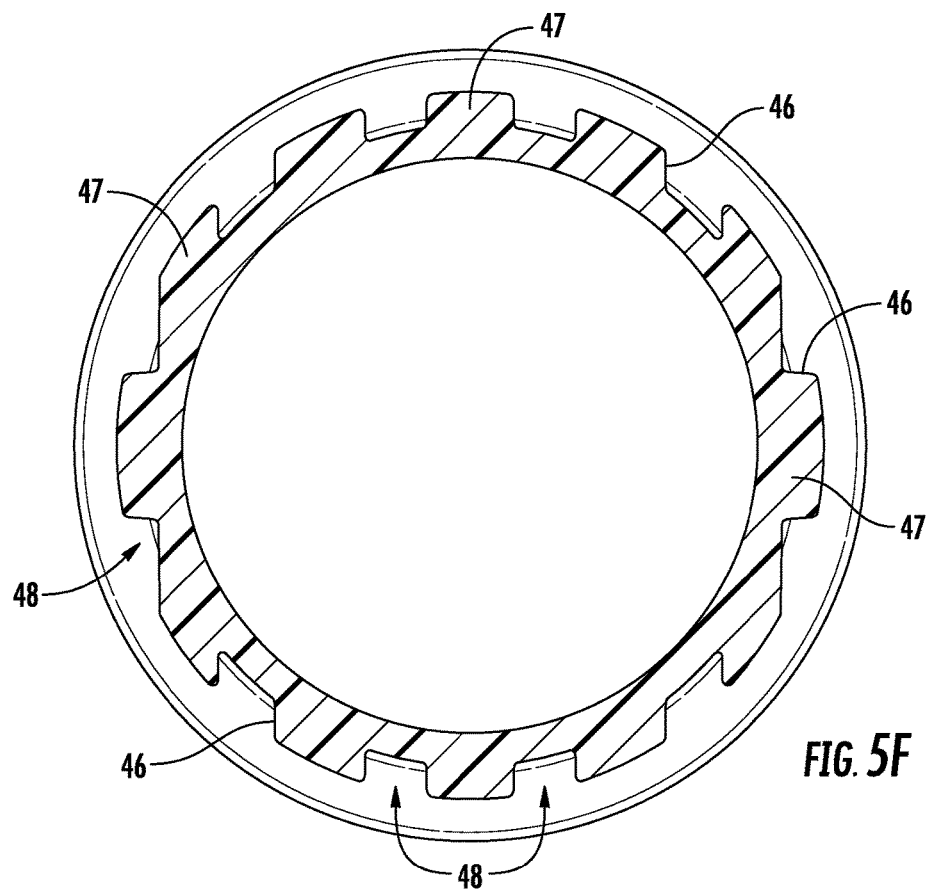
FIG. 5F is a top sectional view of the neck finish of FIG. 5A as taken along line 5F-5F of FIG. 5B.

Tuning to FIG. 5F, in some embodiments, the vertical slots 48 formed about the lower support portion 42 each extend generally parallel to one another, such that the edges 46 defining the ribs 47 are also formed parallel to another. Although not illustrated, in other embodiments, the arrangement and configuration of the vertical slots 48 about the lower support portion 42 may include any other number of arrangements, such as e.g., embodiments in which each of the ribs 47 and vertical slots 48 extend generally tangentially relative to the exterior of the neck finish 30. In yet other embodiments, the ribs 47 and vertical slots 48 may be formed in yet any other number of configurations in which the ribs 47 and/or vertical slots 48 may be identical or may include any number of and any combination of varied vertical slot 48 and/or rib 47 configurations.

In addition to minimizing the weight and overall volume of the retaining structure 40, the inclusion of a plurality of vertical slots 48 about the circumference of the lower support portion 42, such as e.g. illustrated by the embodiment of FIGS. 5A-5F, provides the lower support portion 42 with a corrugated or scalloped neck finish 30 that may more reliably and more quickly break the frangible connections 14 between the closure 10 and tamper band 20 upon initial removal of the closure 10.

In particular, because the outermost diameter of the lower support portion 42 and the innermost diameter of the J-band 21 are substantially similar when the closure 10 is attached to the neck finish 30, this close dimensional relationship may result in the J-band 21 being partially stretched or tensioned across the vertical slots 48 extending between adjacent ribs 47 during initial removal of the closure 10 from the container. As a result of this tension, there is a certain degree of interlock between the J-band 21 and the lower support portion 42 of the retaining structure 40 which prevents rotation of the tamper band 20 with the closure 10 when the closure 10 is rotated during initial opening of the container.

By minimizing or preventing rotation of the tamper band 20 relative to the container neck finish 30, the tension imparted onto the J-band 21 as a result of the corrugated configuration of lower support portion 42 thereby subjects the tamper band 20 to a torsional force in addition to the axial tensile force imparted on the tamper band 20 via the interaction of the J-band 21 engagement surface 23 with the lower surface 41c of the retention portion 41. This combined torsional and tensile force on the tamper band 20 may result in earlier rupture of the frangible elements 14 connecting the closure 10 and tamper band 20, thereby improving tamper band breakage so that a quicker and more reliable separation of the tamper band 20 from the closure 10 is obtained.

Figure 6A:
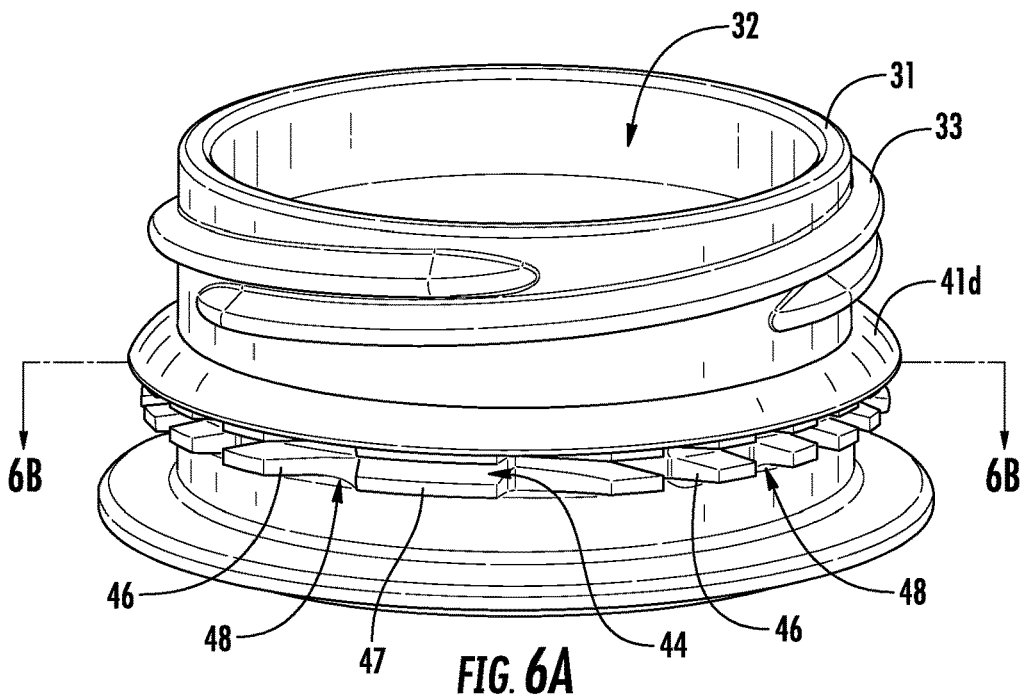
FIG. 6A is a top perspective view of a neck finish according to one embodiment.
Figure 6B:
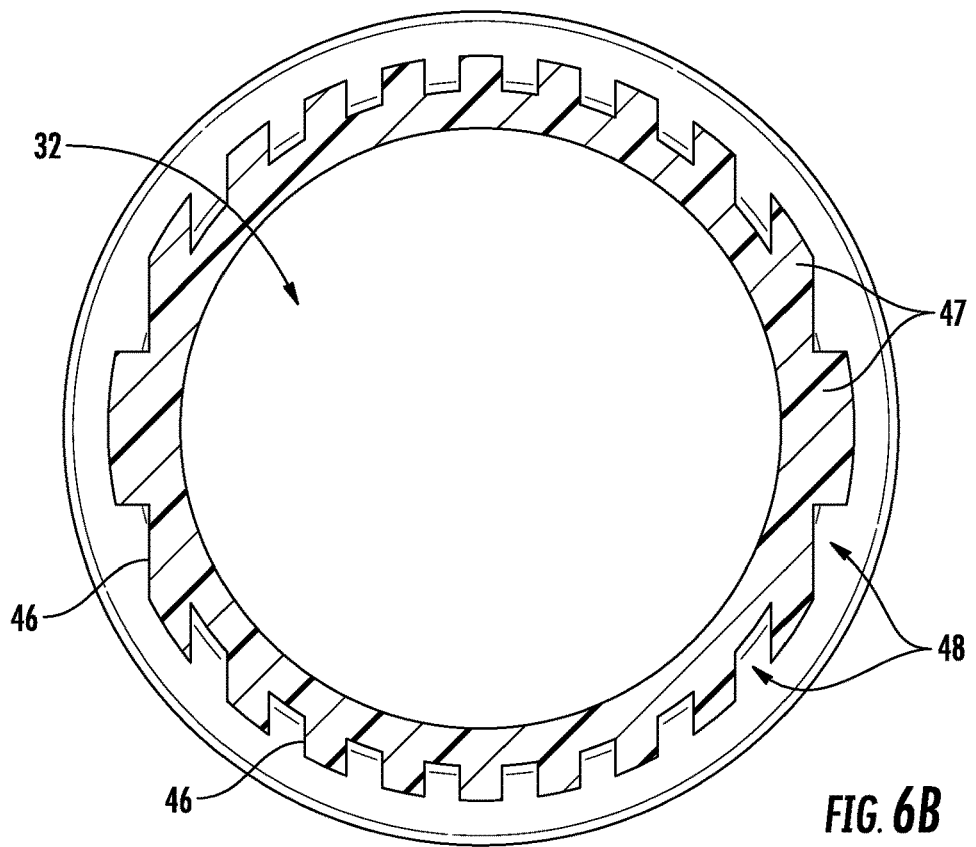
FIG. 6B is a top sectional view of the neck finish of FIG. 6A as taken along line 6B-6B of FIG. 6A.
Figure 7:
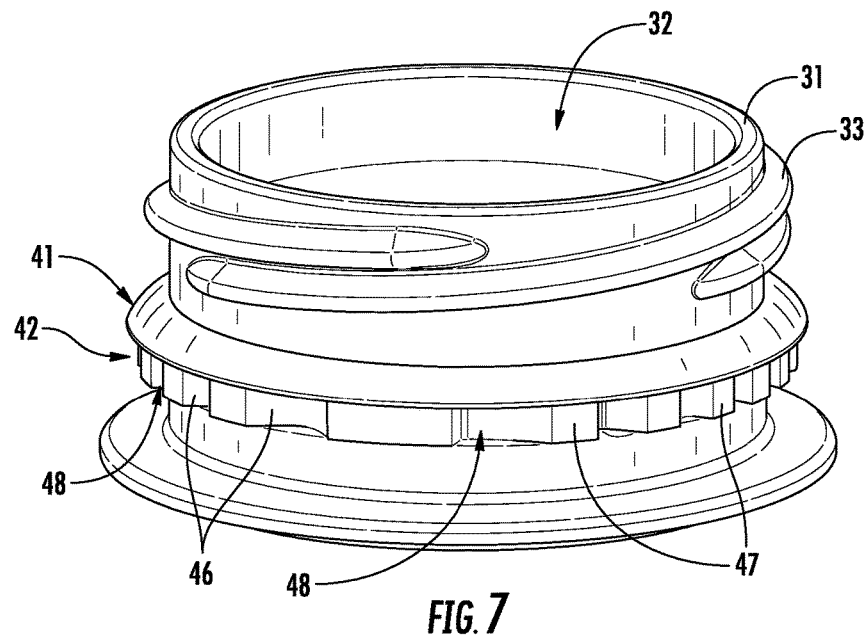
FIG. 7 is a top perspective view of a neck finish according to one embodiment.
Figure 8:
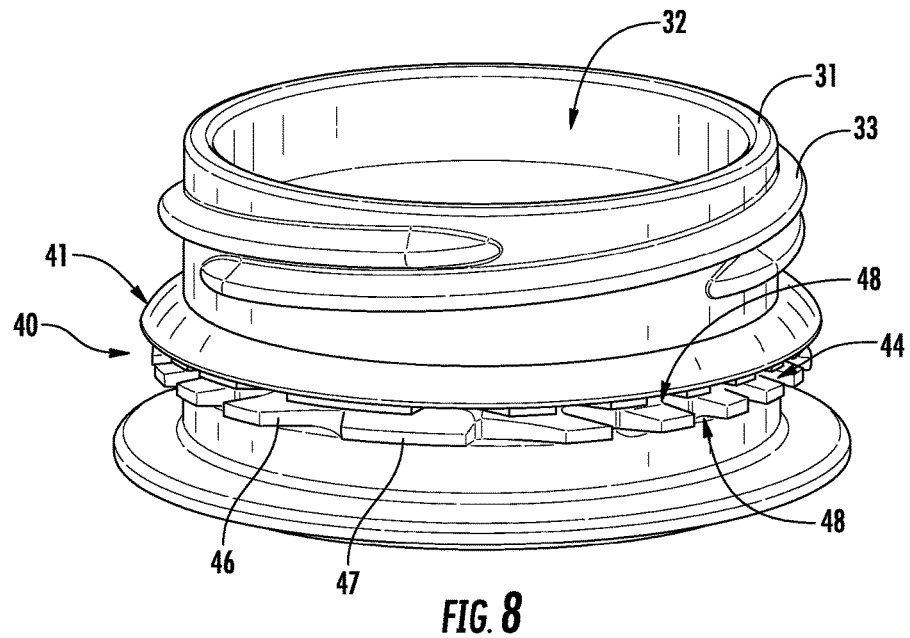
FIG. 8 is a top perspective view of a neck finish according to one embodiment.

Illustrated in FIGS. 6-8 are additional embodiments of additional retaining structure 40 configurations that provide lower weight options to conventional retaining structures. For example, illustrated in FIGS. 6A and 6B is a retaining structure 40 configuration incorporating a circumferential slot 44 and vertical slots 48 similar to those of the embodiment of FIGS. 5A-5F, except for the relative number, spacing and sizing of the vertical slots 48. Referring to FIG. 7, an embodiment of a neck finish having a retaining structure 40 having a lower support portion 42 formed with vertical slots 48 and ribs 47, similar to those of the embodiment of FIGS. 6A and 6B is illustrated, with the exception that the retaining structure 40 embodiment of FIG. 7 does not incorporate a circumferentially extending slot 44.

In FIG. 8, a retaining structure 40 embodiment having a vertical slot 44, ribs 47 and vertical slots 48 similar to those of the embodiment of FIGS. 6A and 6B is shown, with the expectation that the top row of ribs 47 and vertical slots 48 is radially offset from the bottom row of vertical slots 48 and ribs 47.

Although in various embodiments of the retaining structure 40 the vertical slots 48 and/or the one or more circumferential slots 44 are illustrated as extending entirely through the depth of the lower support portion 42 to the exterior of the neck finish 30, in some embodiments the vertical slots 48 and/or circumferential slot 44 may extend only partially through the depth of the lower support portion 42, may extend further radially inwards than the exterior of the neck finish 30, and comprise any number or combination of depths to which the slots 44 and/or 48 extend.

Figure 9:
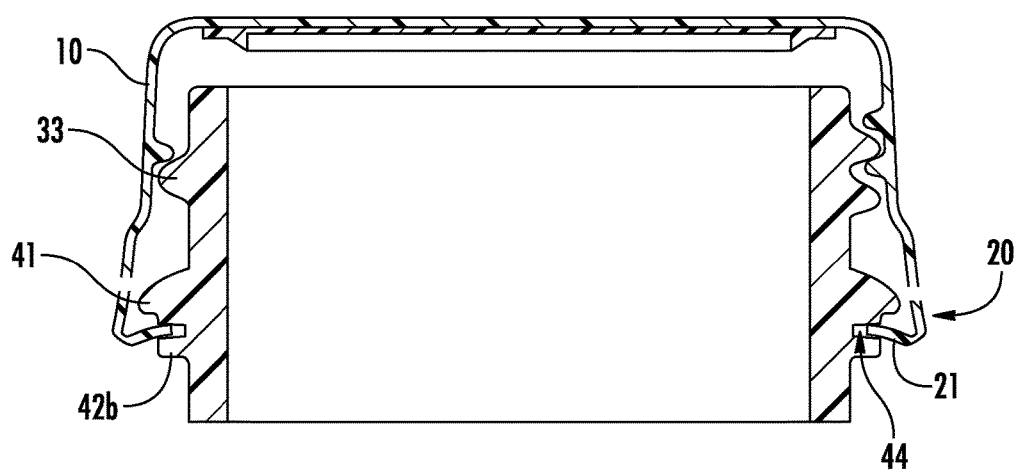
FIG. 9 illustrates the engagement of a tamper band of a closure with the retaining structure of a neck finish following initial removal of the closure from the neck finish according to one embodiment.

As noted above, in addition to the weight, material, time, and cost savings the various embodiments of retaining structure 40 and neck finish 30 configurations shown in the figures and described herein provide as compared to conventional retaining structure configurations, an additional benefit provided by the incorporation of a circumferentially extending slot 44 about the lower support portion 42 comes in the form of increased tamper evidencing. As illustrated in FIG. 9, when a closure 10 having J-band 21 tamper band retaining elements is initially removed from a neck finish 30 having a circumferentially extending slot 44 as described herein, the slot 44 may serve to trap or hold the free end 23 of the J-band 21 as the closure 10 moves upwards relative to the neck finish 30. This engagement of the free end 23 of the J-band 21 within the slot 44 may result in the tamper band 20 being distorted radially outwards, which may provide additional and enhanced visual representation to a user that the container has been opened.

It is to be understood that a neck finish 30 having a retaining structure 40 as described herein may be used with containers made from any number of materials, including, e.g. PET, containers configured to store any number of types of contents, and containers configured to undergo any number of storage, use and/or processing conditions.

Figure 10A:
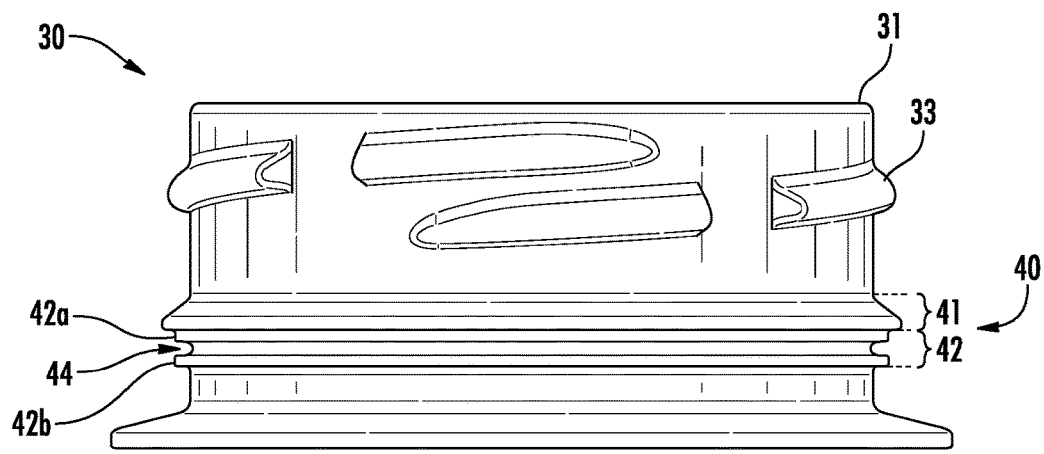
FIG. 10A is a side view of a neck finish for a hot fill and aseptic container according to one embodiment.
Figure 10B:
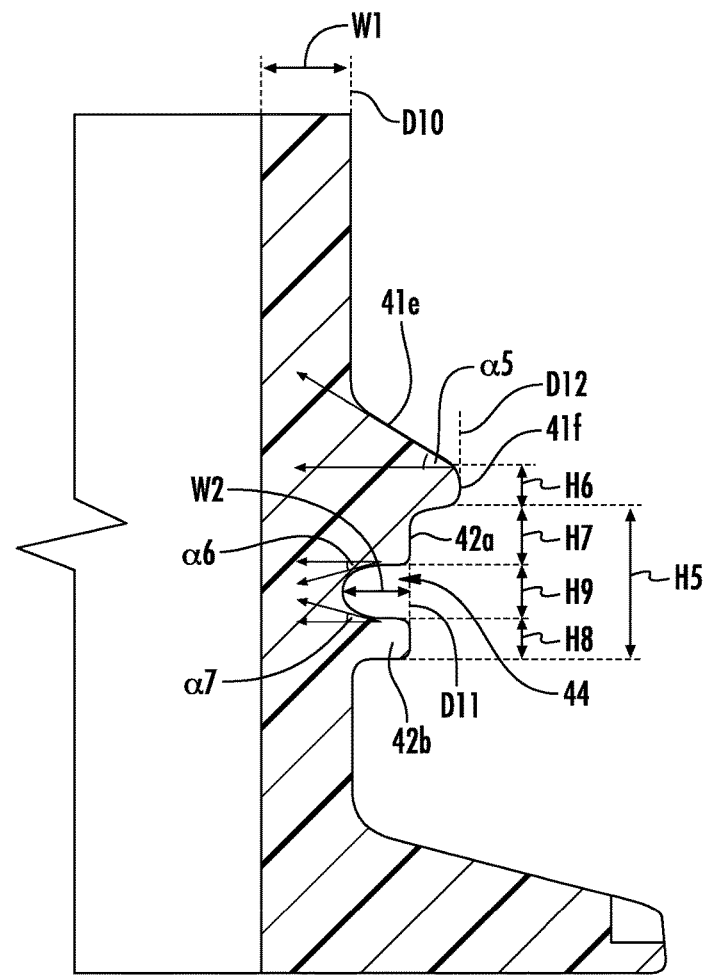
FIG. 10B is a sectional view of the retaining structure portion of the neck finish of FIG. 10A.

For example, turning to FIGS. 10A and 10B, in one embodiment, a neck finish and retaining structure 40 may be configured to be used with containers of any size, such as e.g. 33 mm or 48 mm neck finish containers configured for use under hot fill and/or aseptic conditions. The neck finish 30 and retaining structure 40 configuration of the embodiment illustrated in FIGS. 10A and 10B incorporates many of the same and similar features of the other neck finish 30 embodiments described and illustrated herein. However, as shown in FIG. 10B, the upper surface of retention portion 41 extends along a downwardly angled, substantially flat upper surface 41e.

Also, in some retaining structure 40 embodiments, such as, e.g. the embodiment shown in FIG. 10B, the slot 44 may be more pronounced relative to the lower support portion 42. For example, the slot 44 may be defined by a relatively larger vertical opening and/or slot 44 may extend further radially inwards relative to other retaining structure 40 embodiments. For example, as shown in the embodiment of FIGS. 10A and 10B, an innermost portion of the slot 44 may extend radially inwards relative to the exterior surface of the neck finish 30.

Referring to FIG. 10B, in one embodiment, neck finish 30 may have an exterior diameter D10 as measured at a location below thread 33 and above retaining structure 40 that is between approximately 0.900 inches and approximately 1.700 inches, more specifically between approximately 1.100 inches and approximately 1.500 inches, even more specifically between approximately 1.200 inches and approximately 1.450 inches, and even more specifically approximately 1.370 inches.

Lower support portion 42 may have an outermost diameter D11 that is between approximately 1.000 inches and approximately 2.000 inches, more specifically between approximately 1.300 inches and approximately 1.700 inches, even more specifically between approximately 1.400 inches and approximately 1.500 inches, and even more specifically approximately 1.433 inches.

Lower support portion 42 may have a height H5 that is between approximately 0.030 inches and approximately 0.130 inches, more specifically between approximately 0.050 inches and approximately 0.110 inches, even more specifically between approximately 0.070 inches and approximately 0.090 inches, and even more specifically approximately 0.080 inches.

Retention portion 41 may have an outermost diameter D12 that is between approximately 1.100 inches and approximately 2.100 inches, more specifically between approximately 1.300 inches and approximately 1.800 inches, even more specifically between approximately 1.400 inches and approximately 1.600 inches, and even more specifically approximately 1.482 inches.

An outermost portion 41f of retention portion 41 that extends generally perpendicularly downwards from the substantially flat upper surface 41e of retention portion 41 may have a height H6 that is between approximately 0.000 inches and approximately 0.005 inches, more specifically between approximately 0.001 inches and approximately 0.003 inches, and even more specifically approximately 0.002 inches.

The substantially flat upper surface 41e of retention portion 41 that extends radially outwards from the exterior of the neck finish 30 may extend along an angle $\alpha 5$ relative to the horizontal axis of between approximately 10° and approximately 50°, more specifically between approximately 20° and approximately 40°, even more specifically between approximately 25° and approximately 35°, and even more specifically approximately 30°.

The width W1 of the wall of the neck finish 30 may be between approximately 0.020 inches and approximately 0.080 inches, more specifically between approximately 0.030 inches and approximately 0.070 inches, even more specifically between approximately 0.040 inches and approximately 0.060 inches, and even more specifically approximately 0.047 inches.

The width W2 of the slot 44 may be between approximately 0.010 inches and approximately 0.060 inches, more specifically between approximately 0.020 inches and approximately 0.050 inches, even more specifically between approximately 0.030 inches and approximately 0.040 inches, and even more specifically approximately 0.035 inches.

An upper surface 44a of the slot may extend radially inwards from the outermost exterior surface of the upper portion 42a of lower support portion 42 along an angle $\alpha 6$ relative to a horizontal axis of between approximately 0° and approximately 10°, more specifically between approximately 1° and approximately 7°, and even more specifically between approximately 2° and approximately 5°.

A lower surface 44b of the slot may extend radially outward from the innermost portion of slot 44 to the exterior surface of the lower portion 42b of the lower support portion 42 along an angle $\alpha 7$ relative to a horizontal axis of between approximately 8° and approximately 18°, more specifically between approximately 11° and approximately 15°, and even more specifically between approximately 12° and approximately 14°.

A height H7 of the upper portion 42a of the lower support portion 42 may be between approximately 0.010 inches and approximately 0.060 inches, more specifically between approximately 0.015 inches and approximately 0.050 inches, even more specifically between approximately 0.020 inches and approximately 0.040 inches, and even more specifically approximately 0.029 inches.

A height H8 of the slot 44 may be between approximately 0.010 inches and approximately 0.060 inches, more specifically between approximately 0.015 inches and approximately 0.050 inches, even more specifically between approximately 0.020 inches and approximately 0.040 inches, and even more specifically approximately 0.028 inches.

A height H7 of the lower portion 42b of the lower support portion 42 may be between approximately 0.010 inches and approximately 0.050 inches, more specifically between approximately 0.015 inches and approximately 0.040 inches, even more specifically between approximately 0.020 inches and approximately 0.030 inches, and even more specifically approximately 0.023 inches.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

I claim:

1. A container comprising:
    a body portion defining an interior; and
    a neck finish comprising:
        a cylindrical neck having a first end and a second end;
        a channel extending between the first end and the second end of the neck;
        the first end of the neck being attached to and extending from an upper end of the body portion;
        the second end of the neck defining an opening configured to provide for fluid communication between the interior of the body portion and a location outside the container;
        a thread extending about an exterior surface of an upper portion of the neck, the thread configured to engage a corresponding engagement structure on a closure to seal the opening when a closure is attached to the neck; and
        a retention element extending outwardly from the exterior surface of the neck at a location below a lowermost portion of the thread, the retention element configured to engage a corresponding retention structure on a tamper band portion of a closure upon initial removal of a closure formed with a tamper band from the neck of the container, the retention element comprising:
            a first structure comprising:
                an upper surface extending between a first end and a second end, the first end of the upper surface attached to the exterior surface of the neck; and
                a lower surface extending between a first end and a second end, the first end of the lower surface being attached to the exterior surface of the neck;
                the second end of the upper surface and the second end of the lower surface each being located radially outwards relative to the exterior surface of the neck at substantially the same distance as measured from a vertical axis about which the neck is centered;
                the second end of the upper surface and the second end of the lower surface each being located at substantially the same height along the vertical axis;
                the upper surface extending between the upper surface first end and the upper surface second end along a curve; and
            a second structure comprising:
                a circumferentially extending main body portion having an uppermost end attached to and extending downwards from a bottom end of the lower surface of the first structure;
                a radially outermost portion of an exterior surface of the main body being located radially inwards relative to each of the second ends of the of the upper and lower surfaces of the first structure;
                a lowermost end of the exterior surface of the main body being located radially outwards relative to the exterior surface of the neck and radially inwards relative to each of the second ends of the of the upper and lower surfaces of the first structure; and
                a circumferentially extending groove formed within and extending circumferentially about at least a portion of the main body at a height along the main body located between the uppermost end and the lowermost end;
                the circumferentially extending groove having a height as measured along the vertical axis and a length as measured in a circumferential direction, the length of the circumferentially extending groove being greater than the height of the circumferentially extending groove.

2. The container of claim 1, wherein the circumferentially extending groove extends uninterruptedly about the entirety of the main body.

3. The container of claim 1, further comprising one or more generally vertically grooves extending within the main body, each of the generally vertical grooves extending between at least a portion of the uppermost end and the lowermost end of the main body.

4. The container of claim 1, wherein the uppermost end of the main body is located radially outwards relative to the lowermost end of the main body.

5. The container of claim 1, wherein the uppermost end of the main body and the lowermost end of the main body are each located at the same radial distance from the vertical axis.

6. The container of claim 1, with a radially innermost portion of the circumferentially extending groove and a portion of the exterior surface of the neck located immediately below the lowermost end of the main body each being located at substantially the same radial distance from the vertical axis.

7. The container of claim 1, further comprising contents within the interior of the container.

8. A container comprising
a body defining a cavity;
a neck finish having a first end attached to and extending upwards from the body;
an opening defining a second end of the neck finish;
a flow channel defined between the first end and the second end of the neck finish, the flow channel configured to allow contents to pass through the opening in the neck finish and into or out from the body cavity;
a thread extending about the exterior of the neck finish at a location proximate the neck finish second end; and
an engagement structure formed about the exterior of the neck finish at a location below the thread, the engagement structure comprising:
a circumferentially extending upper bead defined by an upper surface that extends from a first end attached to the exterior of the neck finish to a second end located below the first end, the second end being radially spaced from the exterior of the neck finish and the upper surface extending from the first end to the second end along a curve;
the upper bead further being defined by a lower surface that extends generally perpendicularly radially outwards from the exterior of the neck finish towards the second end of the upper surface of the upper bead; and
a circumferentially extending lower bead located immediately below the lower surface of the upper bead, at least a portion of an exterior of the lower bead being defined by:
a first section having a first end attached to a lower surface of the upper bead, the first section extending downwardly from the lower surface of the upper bead;
a second section having a first end attached to a second end of the first section, the second section extending radially inwards from the second end of the first section;
a third section having a first end attached to a second end of the second section, the third section extending radially outwards from the second end of the second section; and
a fourth section having a first end attached to a second end of the third section, the fourth section extending downwardly from the second end of the third section;
wherein a radially outermost portion of an exterior surface of the lower bead is located radially inwards relative to the second end of the upper surface of the upper bead and radially outwards relative to the exterior of the neck.

9. The container of claim 8, wherein the first section and fourth section each extend radially inwards, such that the second ends of each of the first section and fourth section each are located closer to the exterior surface of the neck finish than the first ends of each of the first section and fourth section.

10. The container of claim 8, wherein the first section and the fourth section each extend downwards in a direction parallel to a vertical axis about which the neck finish is centered.

11. The container of claim 8, further comprising a closure comprising a top panel, a downwardly extending skirt, a thread formed along an inner surface of the skirt, and a tamper band attached to a lower portion of the skirt by one or more frangible connectors, the tamper band including at least one engagement element extending radially inwards from an inner surface of the tamper band;
wherein when the closure thread is engaged to the thread on the neck finish such that the closure fluidly seals the container, a radially innermost portion of the engagement element is located below the lower surface of the upper bead at a radial distance between an outermost surface of the first section of the lower bead and the second end of the upper bead.

12. The container of claim 11, wherein the engagement element of the tamper band comprises at least one upwardly and radially inwardly extending wall, the wall having a free upper end and a lower end that is attached to a lower end of the tamper band.

13. The container of claim 8, wherein one or both of the first section and fourth section are defined by a plurality of outwardly extending ribs, each rib being separated in a circumferential direction from an adjacent rib by a gap.

14. The container of claim 8, wherein the first section defines a substantially cylindrical exterior surface that extends uniformly and uninterruptedly about the entire circumference of the neck finish.

15. The container of claim 14, wherein the fourth section defines a substantially cylindrical exterior surface that extends uniformly and uninterruptedly about the entire circumference of the neck finish.

16. A container comprising
a container body defining a cavity;
a neck finish having a first end attached to and extending upwards from the body;
an opening defining a second end of the neck portion;
a flow channel extending between the first end and the second end of the neck portion, the flow channel configured to allow contents to pass through the opening in the neck finish and into or out from the body cavity;
a thread extending about the exterior of the neck finish at a location proximate the neck finish second end; and
an engagement structure formed about the exterior of the neck finish at a location below the thread, the engagement structure comprising:
a circumferentially extending upper engagement structure defined by an upper surface that extends from a first end to a second end along a curve;
the first end of the upper surface being attached to the exterior of the neck;

the second end of the upper surface being located at a position along a vertical axis about which the neck finish is centered that is below the first end of the upper surface;

the upper engagement structure further being defined by a lower surface that extends generally perpendicularly radially outwards from the exterior of the neck finish towards the second end of the upper surface of the upper bead; and a second lower engagement structure comprising:
- a first plurality of retention elements attached to and extending radially outwards from an exterior of the neck portion, each retention element being separated from an adjacent retention element by a gap;
- each of the retention elements of the first plurality of retention elements having a curved outer surface, the curved outer surfaces of each of the retention elements being arranged about a first generally circular path centered about the vertical axis;
- a second plurality of retention elements attached to and extending radially outwards from an exterior of the neck portion, each retention element being separated from an adjacent retention element by a gap;
- each of the retention elements of the second plurality of retention elements having a curved outer surface, the curved outer surfaces of each of the retention elements being arranged about a second generally circular path centered about the vertical axis;
- wherein each of the retention elements of the first plurality of retention elements is located at a first height relative to the vertical axis;
- wherein each of the retention elements of the second plurality of retention elements is located at a second height relative to the vertical axis, the second height being lower than the first height; and
- at least one laterally extending channel defined between a lower surface of at least one of the retention elements of the first plurality of retention elements and an upper surface of at least one of the retention elements of the second plurality of retention elements.

17. The container of claim 16, wherein the configuration, size and arrangement of the first plurality of retention elements is the same as the configuration, size and arrangement of the second plurality of retention elements.

18. The container of claim 16, wherein each of the retention elements of the first plurality of retention elements are identical.

19. The container of claim 16, wherein the retention elements of the first plurality of retention elements are not all identical.

20. The container of claim 19, wherein at least some of the retention elements of the first plurality of retention elements are separated from adjacent retention elements of the first plurality of retention elements by a portion of the neck finish exterior surface.

* * * * *